United States Patent [19]

Mervin

[11] 4,205,112
[45] May 27, 1980

[54] PROCESS FOR FORMING HIGH VISCOSITY COATING COMPOSITIONS FOR FABRIC SUBSTRATES

[75] Inventor: Gaillard A. Mervin, Concord, N.C.

[73] Assignee: Reichhold Chemicals, Incorporated, White Plains, N.Y.

[21] Appl. No.: 969,440

[22] Filed: Dec. 14, 1978

[51] Int. Cl.² ............... B05D 3/02; B32B 27/00; C08F 37/08
[52] U.S. Cl. .................. 428/245; 118/612; 118/628; 118/638; 260/4 R; 260/29.6 H; 260/29.6 T; 427/373; 427/389.9
[58] Field of Search ........... 428/290; 118/612, 628, 118/638; 427/196, 63.90 R, 373; 428/245, 290; 260/4 R, 29.6 H, 29.6 T

[56] References Cited

U.S. PATENT DOCUMENTS

| | | | |
|---|---|---|---|
| 3,366,584 | 1/1968 | Zimmerman | 260/4 |
| 3,657,175 | 4/1972 | Zimmerman | 260/29.6 T |
| 3,825,435 | 7/1974 | Hart | 427/196 |
| 4,138,518 | 2/1979 | Sammak | 260/17.45 T |

Primary Examiner—Michael R. Lusignan

[57] ABSTRACT

A process for forming a high viscosity coating composition from low viscosity polymeric colloidal dispersion by substantially effecting the thickening of the colloidal dispersion in a mixing head, and for producing from the mixing head a range of high viscosity coatings using the same low viscosity polymeric colloidal dispersion.

8 Claims, 1 Drawing Figure

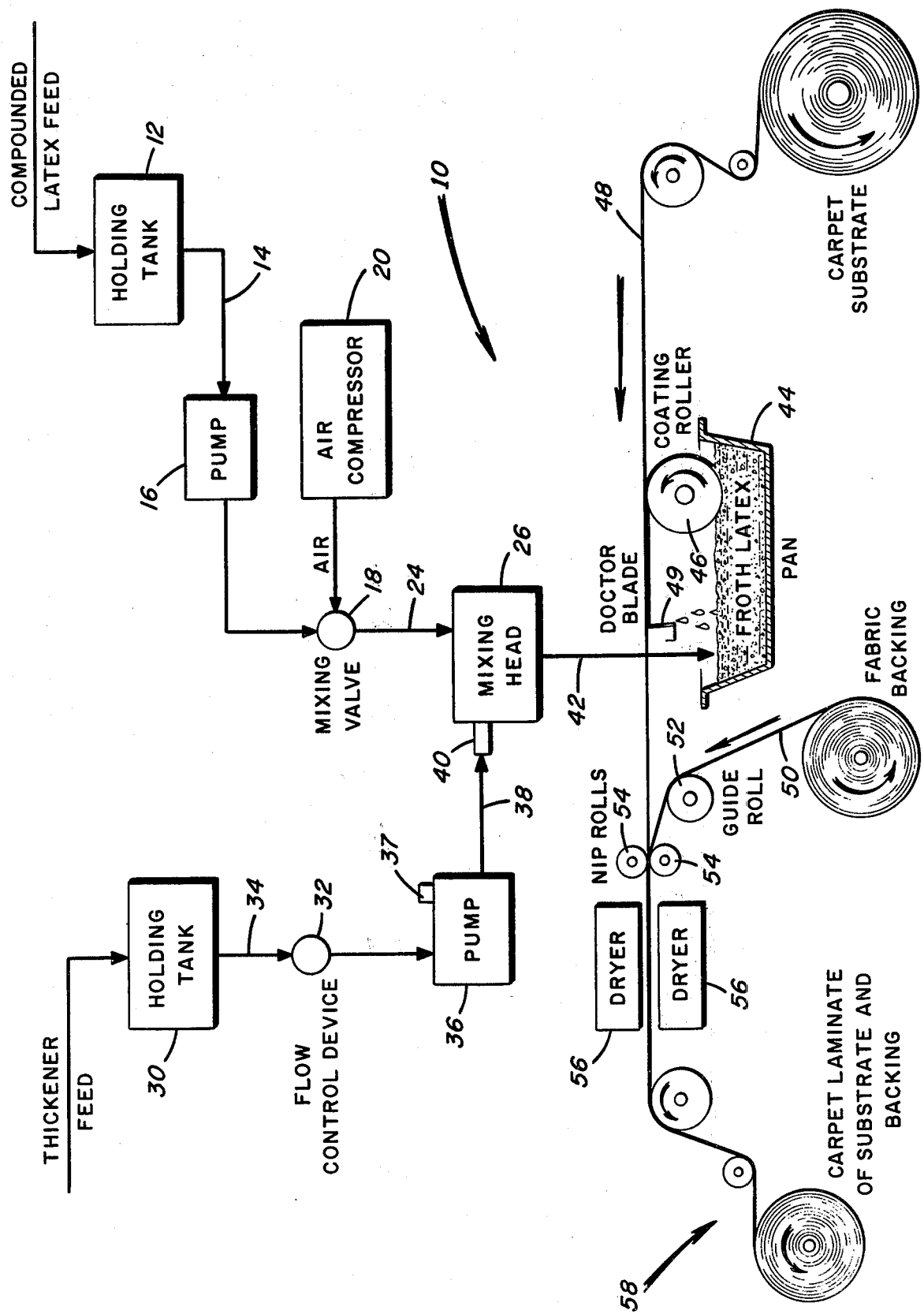

PROCESS FOR FORMING HIGH VISCOSITY COATING COMPOSITIONS FOR FABRIC SUBSTRATES

BACKGROUND OF THE INVENTION

This invention relates to producing improved high viscosity polymeric coating compositions from a low viscosity polymeric colloidal dispersion such as polymeric latex and emulsions for use in coating fabric substrates. More particularly, the invention relates to producing a high viscosity froth coating composition for coating fabric substrates such as carpet and the like by injecting a polymeric thickener emulsion into a mixing head containing a low viscosity polymeric compound with agitation to produce high viscosity froth polymeric coating composition. The invention also relates to the changing of the viscosity of the forth polymeric coating composition by varying the amount of polymeric thickener emulsion injected into the mixing head, thus allowing the use of low viscosity polymeric compounds to produce a variety of froth viscosities.

Fabric coating compositions such as aqueous froth compositions are formed by first compounding a low viscosity polymeric compound with a suitable thickener emulsion and other additives such as antioxidents, defoamers, plasticizers, fillers, extenders, froth aids, and the like, in a compounding tank and then passing the compounded polymeric composition through a conduit pipe to a high speed mixing head located adjacent to a coating apparatus. Air is introduced into the composition immediately before its passage into the mixing head so that proper frothing is accomplished in the mixing head.

In the mixing head, the polymeric composition is thoroughly mixed by high speed agitation to froth the polymeric composition which, due to the presence of thickener added in the compounding tank, is of a higher viscosity than the viscosity of the polymeric compound. The froth polymeric composition exiting from the mixing head is immediately conveyed to a pan for roller application of the froth over the surface of a substrate to deposit a uniform coating of the new frothed polymeric composition.

The stability of the froth and the control of the size of bubbles formed by frothing are related to the degree of increase in viscosity which can be produced, which of course is dependent on the amount of thickener emulsion that is mixed in the low viscosity polymer compound during the compounding operation. The amount of thickener emulsion that can be incorporated into the polymeric coating composition is limited by the requirement for adequate flow of the compound polymeric composition through the conduit pipes to the mixing head located near or adjacent to the coating mechanism. The action of the thickener increases the viscosity of the compounded polymer composition making it more resistant to conduit flow. Thus, if too much thickener is added in an effort to increase the viscosity of the froth polymeric composition exiting from the mixing head, the resistance to flow will become so great that the flow of the polymeric composition to the mixing head will not be adequate for practical production use.

Since the total amount of thickener used is an inherent part of the initial compounding of the polymeric composition, its viscosity is predetermined before it enters the mixing head. Because of the fixed viscosity of the froth polymeric coating composition, it can be used for one type of coating. Thus, if there is a change of substrate or other conditions requiring a different viscosity of the froth composition, a new batch of polymeric composition with the required viscosity must be compounded before the change of substrate or conditions is completed. This results in increased down-time and a reduction in the amount of finished product produced. In addition, since some time is required before production normalizes after the change, significant amounts of scrap material are produced.

The closest prior art known to the Applicant is disclosed in the U.S. Pat. No. 3,825,435 to Hunt which covers a process for flocking a moving substrate material by applying a formulated mixture prepared from three separate reactants by first maintaining in separate reservoirs an acrylic adhesive, an adhesive thickening agent, and a thickening reactant with a curing catalyst. Adjustable metered quantities of material from each reservoir are brought together in a cooled mixture head and delivered from the mixing head to the surface of a moving substrate. Applicant's process differs significantly from that of Hunt supra in that a low viscosity butadiene-styrene emulsion polymeric composition is compounded with additives to form a finished low viscosity coating composition which is then passed into a high speed mixing zone where a metered amount of an acid-type thickener emulsion is injected to produce a high viscosity compound exiting from the mixing zone. The viscosity of the exiting formulation is controlled only by the amount of thickener emulsion injected into said mixing zone since no curing catalyst or thickening reactant is added.

SUMMARY OF THE INVENTION

This invention contemplates an improved process for producing frothed polymeric coating compositions having higher obtainable viscosities from an initial low viscosity compounded polymeric compound that can be adjusted at will to produce a variety of different froth viscosities without recompounding. This allows for the coating of substrates having different constructions which require different coating viscosities to be accomplished with the single basic low viscosity polymer composition.

This is accomplished by passing a compounded low viscosity polymeric composition without the necessary amount of thickener required to produce the desired viscosity in the mixing head through the conveyor pipping system to the mixing head, with a froth producing medium such as compressed air being injected prior to entering the mixing head. In the mixing head the aerated polymeric composition is subjected to a frothing operation in which the polymeric composition and the froth producing medium are shear agitated at high speeds. As the mixture passes through the mixing head, a metered amount of a thickener emulsion is injected through a small orifice into the mixing head. The high speed agitation in the mixing head produces immediate dispersal of the thickener emulsion throughout the polymeric composition under high shear conditions so as to produce a homogeneous distribution of particles of the thickener emulsion. The froth thus produced is of uniformly fine bubble construction with the mass being of a higher viscosity. Since more thickener can be injected into the polymeric composition, its effectiveness is greatly enhanced due to the high speed dispersal of the thickener emulsion through the composition.

The froth composition formed by the process of this invention, having improved higher viscosity, can be tailored so as to provide the required degree of penetration into the crevices and indentations of the network of the fabric substrate during coating application to produce a more effective coating than heretofore produced in the art. Also, due to the method of thickener injection, a more effective coating of the fabric with less froth polymeric composition is possible while still obtaining highly improved coating results.

Many other advantages are produced by the process of this invention: for example, it has also been found that, by the proper selection of thickeners and their use by the process of this invention, smaller amounts of froth aids may be used to produce the improved polymeric high viscosity froth. The use of a froth aid helps to stabilize the froth produced in the mixing head. Also, by injecting the thickeners into the polymeric composition at the mixing head, a reduction is obtained in the amounts of polyacrylate thickeners required, thus producing coating compositions having higher compound solids in the finished froth latex. In addition, by injecting thickener emulsions into the mixing head, there is a reduction in the total coating cost since a lower weight froth composition is required to coat the substrate because the froth is more effectively used. Use of the high viscosity coatings of this invention produces other important advantages such as faster running speeds in the coating of substrates which results in reduced energy requirement and improved productivity. Also, with the advent of the ability to use one basic low viscosity polymeric compound for forming several froth polymeric coating compositions in the mixing head with differing viscosities, there is a major reduction in compounding time as well as an elimination of the flow problems in conveying the polymeric compositions containing thickener emulsions from the compounding tank to the mixing head. This is particularly important where the compound holding tank is at a distance from the coating apparatus and the mixing head.

It will be appreciated that the high viscosity polymeric coating compositions of this invention achieved by the injection of thickener emulsions into the mixing head wherein the polymeric material has been aerated produces a more consistent froth composition formation on a day-to-day basis along with improved coating penetration and an evenness of the distributed specific surface of coating on the network of the substrate. This in turn results in improved coating characteristics such as low weights for a given adhesion value while still producing better substrate penetration and higher secondary adhesion values. In addition, better froth pan stability is produced providing a more uniform pick-up and application to the surface of the substrates when a froth application roller pick-up mechanism is used. It will be appreciated that other methods of applying the froth coating may be used such as knife coating, transfer roller coating, roll-over bed plate, and the like.

BRIEF DESCRIPTION OF THE FIGURE

The above and other objects will become apparent from the following description of the process with examples thereof, and the FIGURE which shows a schematic arrangement of a process for forming a frothed high viscosity polymeric coating composition, applying the composition to the surface of a substrate, and if required, applying a backing to the substrate to form a fabric laminate.

DEFINITIONS AND TEST PROCEDURE

"cps" refers to viscosity determined by a Brookfield Synchro-lectric Viscometer with number 5 spindle at a speed of 20 rpm.

"phr" refers to parts added per 100 parts rubber on a dry basis.

"psig" refers to pressure in pounds per square inch gage.

Tests of shag carpet laminates are conducted by cutting a dried laminated carpet into strips three inches wide and determining T-Peel Bond Strength (also known as "stripback") according to ASTM test procedure D-2724. Results are reported in pounds per 3-inch strip. Pile anchor (also known as "tuftlock") is determined by ASTM procedure D-1335. Results are reported in the pounds required to pull out one tuft.

DESCRIPTION OF PREFERRED EMBODIMENTS

In the coating application of polymeric materials in the form of colloidal dispersions such as emulsions and latices, the ability to control and produce high viscosity in the polymeric material adds to the versatility of the coating. This is particularly desirable in the adhesive coating of fabric substrates such as in the primary backing of a carpet laminate for securing a secondary fabric backing to it or to lock the tufts in position in the formation of carpet.

A schematic arrangement 10 illustrates an example of a process for coating a fabric substrate with a froth polymeric composition in the form of an adhesive latex, applying the froth adhesive latex as a coating, and securing to the substrate a backing to form a fabric laminate. The arrangement 10 includes a holding tank or vessel 12 containing a compounded low viscosity latex, without the desired amount of thickener, having a pH on the alkaline side. The holding tank 12 has a feed conduit 14 which is connected to the intake side of a circulating pump 16 which pumps the latex into a mixing valve 18 where compressed air delivered from an air compressor 20 through line 22 is mixed into the latex. From the mixing valve 18, the latex mixed with air is passed through conduit 24 into a mixing head 26 operating at a high mixing speed, where the latex containing air is subjected to a high speed shear agitation.

A second holding tank or vessel 30 containing an acid-type thickener emulsion is connected to a flow control on-and-off valve 32 by conduit 34 which in turn is connected to the intake side of a positive displacement pump 36 which has a metering device in the form of a stroke adjusting mechanism 37 for controlling the amount of thickener emulsion that is pumped through conduit 38 and into an injection nozzle 40 which is positioned in the side wall of the mixing head 26. The injection nozzle 40 is positioned at substantially a right angle to the flow of latex through the mixing head. The amount of thickener injected into the mixing head is controlled by the stroke adjusting mechanism 37 with the orifice size of the injection nozzle 40 assuring proper injection of the thickener emulsion into the mixing head.

In the mixing head the continuous flow of aerated compounded latex which is on the alkaline side is being agitated at high speeds with each pulsating injection of the acid-type thickener emulsion being immediately and thoroughly distributed to increase the viscosity of the latex froth and produce a continuous flow of homogeneous latex froth composition exiting from the mixing head through an exit conduit 42.

The continuous flow of the latex froth composition from conduit 42 is deposited in a pan 44 which contains a pick-up roller 46 which contacts the surface of a continuous web of fabric substrate 48 passing over the roller 46 and applies a froth latex coating to the surface of the web. After the pick-up roller 46 has deposited the coating of the latex froth on the surface of the substrate 48 and moves downstream, a doctor blade 49 scrapes off excess froth coating from the surface of the substrate 48. After the excess froth has been removed, a web of fabric backing 50 is continuously fed over a guide roller 52 and into contact with the coated side of the fabric substrate 48. A pair of nip rolls 54 press the substrate 48 and backing 50 together to adhesively secure them together to form a fabric laminate. The fabric laminate then passes through a dryer 56 where the deposited latex is cured to produce the final degree of adhesion of the fabric webs forming the laminate and the laminate is then passed over a take-up roller mechanism 58 as a finished laminated product.

Advantageously, the degree of froth viscosity which is dependent on the amount of thickener emulsion injected in the mixing head can be changed by adjusting the stroke adjusting mechanism which determines the amount of the thickener emulsion that is injected into the mixing head by metering the amount of thickener emulsion that is drawn into piston cavity. A lowering of the amount of thickener injected produces a froth of one viscosity, and vice versa, an increase of the amount of thickener injected produces a much higher viscosity without the necessity of providing a newly compounded polymeric coating composition in the holding tank.

Typical of the colloidal dispersions that can be treated to produce the high viscosity froth compositions formed by the process of this invention are those formed from elastomeric or flexible polymers in which the polymer chain contains various functional groups pendant from the chain that exhibit good low-temperature curability without the addition of other ingredients. Such polymers may be made by the emulsion interpolymerization of a conjugated diene, such as butadiene, with, inter alia, an ethylenically unsaturated functional monomer such as an $\alpha\beta$-unsaturated carboxylic acid, unsaturated dicarboxylic acids, mono-esters of such dicarboxylic acids, acrylamides and N-methylolacrylamines. In addition to the conjugated diene and the functional monomer, the polymerization mixture may also contain a secondary copolymerizable monomer such as styrene, acrylonitrile, methyl methacrylate, vinylidene chloride and the like. Also cis-polyisoprene latices, natural rubber latices, mixtures of natural latices with cold SBR latices and other synthetic latices may be used.

Exemplary of the thickener emulsion that can be used are the acid-type thickener that can be maintained in thin, nonviscous state and that, when brought in contact with the compounded polymeric colloidal dispersion maintained in the alkaline state will produce an immediate increase in the viscosity of the polymeric dispersion. It has been found that when the compounded polymeric colloidal dispersion is maintained in an environment having a pH of from about 7.5 to about 10 excellent results are produced. It has also been found that the acid-type in situ thickeners disclosed and claimed in U.S. Pat. No. 3,366,584 and U.S. Pat. No. 3,657,175 which are incorporated by reference in this application are typical of the thickeners that may be effectively used. It will be appreciated that in general any type of thickener emulsion may be used that is relatively non-viscous and, when introduced into a colloidal dispersion will blend uniformly therein and convert to a highly viscous condition throughout the colloidal dispersion.

Many of the compounded latex compositions used for coating textiles generally contain large amounts of finely divided inorganic fillers such as whiting ($CaCO_3$), barytes, alumina, pigments, starch and the like. Fillers and extenders may be added up to about 800 phr on a dry basis. These materials are added to impart certain secondary properties such as opacity, fire retardance, stiffness and color and, when starch is used under gelatinizing drying conditions, as set forth in the application for U.S. Pat. No. 857,905, now U.S. Pat. No. 4,138,518, patented Feb. 6, 1979 a measure of additional adhesiveness is imparted to the cured froth polymer compound.

It has been found that high viscosity compositions or formulations which included both polymeric constituents and extenders having a solids content on a dry basis of from about 76% to about 86% produce improved high solids compositions which exhibit excellent froth stability and when applied to the surface of a carpet substrate form effective adhesive coating on the surface of the substrate.

It will be appreciated that the process of this invention produces higher froth viscosities in low viscosity compounded polymeric compositions by providing for the thickener action to take place in the high speed mixing head under froth producing conditions. This may be accomplished by injecting into the mixing head a thickener producing substance that will either change the pH of the compounded latex composition from acid to alkaline so that a thickening action can take place, or by injecting an acid thickener emulsion into the head where the compounded latex composition is in the alkaline state. In either case the compounded polymeric composition into which the thickener emulsion has been injected and homogeneously distributed is immediately changed from a nonviscous to a viscous mass, thus producing a froth composition having high stable viscosities.

In order to describe more clearly the nature of the present invention, specific examples will be described hereinafter. It is to be understood, however, that this is done solely by way of example and is intended neither to delineate the scope of the invention nor limit the ambit of the appended claims.

EXAMPLE I

In the preparation of the froth polymeric composition of this example, air from an air compressor was introduced into the flow of a low viscosity latex formulation just prior to entering the mixing head. The latex formulation was a carboxylated butadiene-styrene polymer including filler designed for use in high solids froth lamination and precoat compounds for carpet application.

The low viscosity latex formulation had a viscosity of 8000 cps and was passed through a high speed mixing head into which a metered amount of an acid thickener emulsion was injected. The thickener emulsion was a carboxylated emulsion polymer designed to function as a thickener in alkaline aqueous systems. The froth latex exiting from the mixing head had a viscosity of 12,000 cps and a cup weight of 950 grams per quart.

A froth viscosity of 12,000 cps is an acceptable viscosity for coating loop commercial grade carpets and produces good penetration into the fabric network of the carpet which is needed for good tuftlock and pile and fuzz control.

By injecting more acid thickener emulsion into the mixing head using the same low viscosity latex formulation as above, the viscosity of the froth latex exiting from the mixing head was quickly changed to 20,000 cps.

This high viscosity froth latex was coated on shag carpets, and when the carpets were tested, the test showed minimal penetration and low coating weight which is desired over coatings of lower viscosities where higher penetration results in higher coating weight.

This example shows the forming of two different froth late viscosities for coating different carpet constructions using one basic compounded latex by the advent of quantitatively using different injections of acid-thickener emulsion in the mixing head.

EXAMPLE II

This example shows the forming of two different froth carpet coatings from the same basic formulation.

A low viscosity butadiene-styrene latex formulation including filler was made in a compounding tank having 82.5% solids on a dry basis and a viscosity of from 7000 to 7500 cps. An acid thickener emulsion capatible with the latex formulation, cut to 9% solids, was used for injection in the mixing head.

Five runs were made with different pump settings for controlling the amount of acid thickener emulsion injected in the mixing head during a froth coating operation. The froth viscosities produced from the mixing head were as follows:

Table A

| Run No. | Thickener Pump Setting, % of Pumping Capacity | Back Pressure in Mixing Head, psig | Cup Weight, lb./gal. | Froth Viscosity, cps |
|---|---|---|---|---|
| 1 | 0 | 55 | 9.63 | 18,000 |
| 2 | 30 | 65 | 8.90 | 22,500 |
| 3 | 30 | 68 | 9.14 | 22,000 |
| 4 | 30 | 70 | 8.61 | 22,000 |
| 5 | 20 | 68 | 9.18 | 17,500 |

Table A-continued

| Run No. | Thickener Pump Setting, % of Pumping Capacity | Back Pressure in Mixing Head, psig | Cup Weight, lb./gal. | Froth Viscosity, cps |
|---|---|---|---|---|
| 6 | 30 | 70 | 9.58 | 20,500 |

Run No. 1 was conducted using a regular carpet coating latex formulation with the only thickener used mixed in the formulation in the compounding tank. The data show this formulation had a viscosity of 18,000 prior to entering the mixing head to form the froth latex.

When the low viscosity latex formulation was used with the thickener emulsion injected in the foaming head, higher viscosities were produced ranging from 22,000 cps to 22,500 cps for the thickener emulsion injection when the thickener pump was set at 30% capacity. When a low viscosity was desired, the pump setting was changed to 20% capacity and produced a viscosity of 17,500 cps from the same basic low viscosity latex formulation being fed to the mixing head from the compounding tank, as is set forth in run No. 5.

Runs 2 through 5 demonstrate the flexibility of the process of this invention in providing different high viscosity froth latices from a basic low viscosity latex formulation.

EXAMPLE III

Using the latex formulation from Example II, three carpet laminating runs were made on different shag-type carpets using froth latex adhesive having a viscosity of 22,000 cps with the acid thickener emulsion injected into the mixing head, and were compared against shag carpet samples coated with froth latex adhesive having a viscosity of 18,000 cps, with the latex formulation being thickened in the holding tank. The data produced are presented in Table B.

Table B

| Carpet | T-Peel Bond Strength | | Pile Anchor Bond Strength | | Weight in oz./sq. yd. of carpet coated with Froth made from Latex Thickener in | |
|---|---|---|---|---|---|---|
| | Thickener in Holding Tank | Thickener in Mixing Head | Thickener in Holding Tank | Thickener in Mixing Head | Holding Tank | Mixing Head |
| 1 | 12.8 (avg)[1] | 19.3 | 17.8 (avg)[1] | 20.9 | 35 | 33.6 |
| | | 13.6 | | 18.6 | | 35.7 |
| | | 14.4 | | 20.6 | | 35.1 |
| 2 | 15.5 (avg)[1] | 15.5 | 7.8 (avg)[1] | 7.6 | 32 | 29.8 |
| | | 15.2 | | 9.1 | | 30.2 |
| | | 18.1 | | 8.7 | | |
| 3 | 12.2 (avg)[1] | 14.5 | 16.6 (avg)[1] | 15.6 | 34 | 33.2 |
| | | 14.2 | | 15.4 | | 33.4 |
| Average | 13.5 | 15.6 | 14.07 | 14.56 | 33.6 | 33.0 |

[1] Is an average bond strength for three samples of carpet in which all the thickener used was mixed in the latex formulation in the holding tank.

It is to be noted from the above data that by using the process of this invention a considerable increase in the T-Peel bond strength of the samples tested was obtained.

In general, it has been found that the process of this invention will reduce the foam weight applied by an overall amount of from 2 to 3 oz. per square yard in addition to increasing the total bond strength of the carpet laminated.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for continuously producing variable high viscosity butadiene-styrene frothed coating compositions from a prepared low viscosity butadiene-styrene coating composition consisting of:

(a) preparing a low viscosity butadiene-styrene polymeric coating composition having a viscosity ranging from about 1000 cps to about 12,000 cps from a low viscosity butadiene-styrene emulsion polymer resin having an alkaline pH range from about 7.5 to 10.5;

(b) flowing the thus formed low viscosity alkaline polymeric coating composition into a high speed froth producing mixing zone;

(c) mixing said low viscosity butadiene-styrene polymeric coating composition as it passes through said mixing zone and during mixing injecting at a selected rate of flow an acid-type polymeric thickener emulsion into the flow of said low viscosity alkaline polymeric coating composition to produce the desired high viscosity frothed coating composition exiting from said mixing zone and having a pH in the alkaline range, said frothed coating composition having an increased viscosity of from about 12,000 cps to about 25,000 cps;

(d) changing when desired the selected rate of flow of the acid-type polymeric thickener emulsion injected into said low viscosity alkaline butadiene-styrene polymeric coating composition being mixed to produce a different high viscosity coating composition in said mixing zone from the same low viscosity alkaline butadiene-styrene polymeric coating composition;

(e) flowing said frothed thickened polymeric composition having said desired high viscosity from said mixing zone to a fabric coating applicator means; and (f) applying continuously to the surface of a carpet backing substrate the high viscosity frothed coating composition produced.

2. The process according to claim 1 wherein the low viscosity butadiene-styrene polymeric compound contains carboxylated butadiene-styrene type resins.

3. The process according to claim 1 wherein the low viscosity butadiene-styrene polymeric compound contains polyacrylate-type resins.

4. The process according to claim 1 wherein said acid-type thickener emulsion is an acid-type carboxylated polymeric thickener emulsion.

5. The process according to claim 1 wherein compressed air is introduced into said low viscosity butadiene-styrene polymeric composition before flowing into said mixing zone.

6. The process according to claim 1 wherein said low viscosity butadiene-styrene polymeric coating composition contains fillers and extenders in amounts up to about 800 phr on a dry basis.

7. The process according to claim 6 wherein the said high viscosity butadiene-styrene polymeric coating composition comprises from about 76% to about 86% by weight solids on a dry basis.

8. A fabric substrate coated by the process of claim 1 in which said fabric substrate is a carpet including a fabric backing adhesively secured to said carpet by said high viscosity butadiene-styrene coating composition.

* * * * *